United States Patent

Miura et al.

[15] 3,688,059

[45] Aug. 29, 1972

[54] TAPE RECORDER WITH PIVOTALLY MOUNTED CASSETTE LOADING PLATE HAVING ROTABLE TAPE GUIDING FINGERS

[72] Inventors: Yotaro Miura; Shojiro Asami

[73] Assignee: Sony Corporation, Tokyo, Japan

[22] Filed: Oct. 30, 1970

[21] Appl. No.: 85,599

[30] Foreign Application Priority Data

Jan. 24, 1970 Japan........................45/6487

[52] U.S. Cl..........179/100.2 Z, 179/100.2 T, 226/91, 274/4 E

[51] Int. Cl.........................G11b 15/66, G11b 23/04

[58] Field of Search..............179/100.2 Z, 100.2 T, 100.2 MD; 226/183, 91, 90, 49; 274/4 D, 4 E

[56] References Cited

UNITED STATES PATENTS

| | | | |
|---|---|---|---|
| 3,540,738 | 11/1970 | Yamamoto et al. | ...79/100.2 Z |
| 3,521,009 | 7/1970 | Auld | ..................179/100.2 Z |
| 3,512,694 | 5/1970 | Sugaya et al. | .......179/100.2 T |

FOREIGN PATENTS OR APPLICATIONS

| | | | |
|---|---|---|---|
| 1,537,240 | 10/1967 | Germany | ............179/100.2 T |

OTHER PUBLICATIONS

IBM Technical Disclosure Bulletin, R. B. Johnson et al., Vol. 9, No. 8, January 1967, 1967, 968.

*Primary Examiner*—Bernard Konick
*Assistant Examiner*—Alfred H. Eddleman
*Attorney*—Lewis H. Eslinger, Alvin Sinderbrand and Curtis, Morris & Safford

[57] ABSTRACT

A loading loading plate having longitudinally rotatably tape tape buiding fingers thereon in the loading the load plate is pivotally mounted on the chassis of a tape recorder. The loading plate is linked to a cassette holder by a substantially "shaped lever shaped lever which permits the loading plate to pivot in response to pivotal cassette of the cassette holder. The cassette holder is pivoted to energize the tape recorder and the loading plate is pivoted therewith so as to place the tape guiding fingers behind the tape in the cassette where the tape can be withdrawn from the cassette.

6 Claims, 2 Drawing Figures

Figure 1:
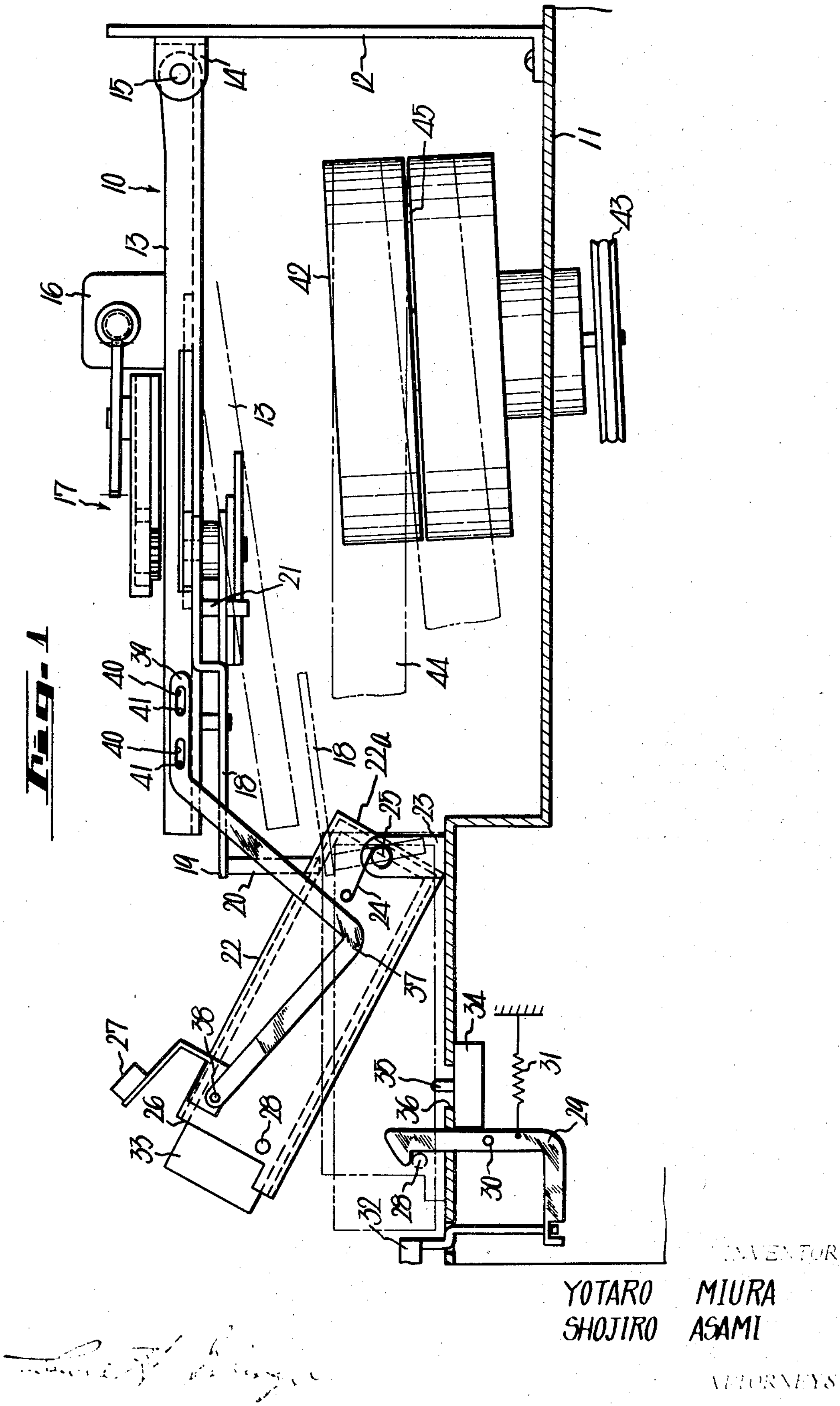

INVENTOR
YOTARO MIURA
SHOJIRO ASAMI
BY
ATTORNEYS

INVENTOR.
YOTARO MIURA
SHOJIRO ASAMI

BY [signature]
ATTORNEYS

TAPE RECORDER WITH PIVOTALLY MOUNTED CASSETTE LOADING PLATE HAVING ROTABLE TAPE GUIDING FINGERS

Tape recorders, and especially, video tape recorders, have become an extremely popular source of audio and combined video/audio entertainment. These devices have now reached the stage of sophistication where the user need only depress an energizing mechanism, and through virtually a fully automatic mechanism sound and audio signals are transcribed upon or are taken off a magnetic tape.

One of these automatic mechanisms comprises a structural arrangement whereby a cassette having a take-up reel and a supply reel therein has a magnetic tape wound on the reels. A plurality of tape guiding fingers are longitudinally and rotatably mounted on the chassis such that the fingers are placed behind the tape; the tape is then longitudinally withdrawn from the cassette and by rotating the fingers, a loop is formed in the tape. This loop is led around a rotating drum which has magnetic heads therein adapted to apply and receive signals from the tape.

It is important that the tape guiding fingers be behind the tape when the device is energized because the fingers initially move longitudinally to withdraw the tape. Naturally, if the fingers were not located behind the tape, the longitudinal movement of the fingers would not grasp the tape to withdraw it.

It is therefore a principal object of the invention to provide a mechanism which will insure that the tape guiding fingers are behind the tape when the device is energized.

It is another object of the invention to provide a linkage which joins the tape guiding mechanism with a cassette holder whereby movement of the holder energizes the device and the tape guiding mechanism is brought into proper position behind the tape.

Basically the tape record/playback mechanism comprises a chassis which has a loading plate pivotably mounted thereon. A plurality of tape guiding fingers are mounted for longitudinal and rotational movement on the loading plate.

A cassette holder is linked to the loading plate by a substantially "L"-shaped lever and a cassette is held within the cassette holder. To energize the tape record/playback mechanism, the cassette holder is lowered whereupon it actuates an on/off switch on the chassis which energizes the tape recorder. The cassette holder is linked to a loading plate which holds the tape guiding fingers. Thus, when the holder is lowered, the loading plate and tape guiding fingers are also lowered because of the linking mechanism between them. This serves to place the fingers behind the tape.

The tape guiding fingers are drawn rearwardly by a gear mechanism and are then rotated. The rotational movement of the fingers forms the tape into a loop. The loop is then placed around a rotating drum having magnetic heads thereon which apply or receive signals from the tape. When the holder is raised, the circuit is broken by the on/off switch and further recording or playback is stopped.

In the accompanying drawing, the preferred embodiment of this invention is illustrated but it is to be understood that specific details of structure may be varied without departing from the basic principles of this invention.

Figure 2:
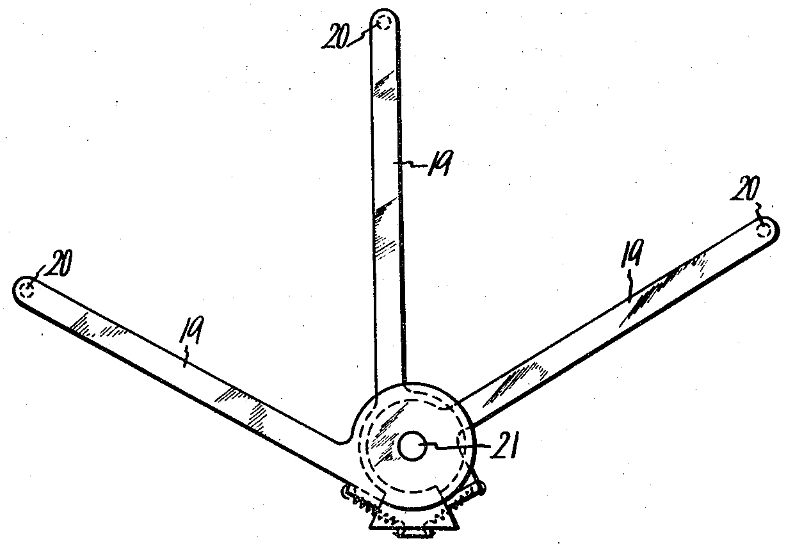

In the drawing:

FIG. 1 is a side view of a tape record/playback mechanism showing raised and lowered positions of the cassette holder; and FIG. 2 is a top view of the fingers forming the tape guiding mechanism.

Referring to the FIG., there is shown a chassis 10 formed with a horizontal wall 11 and upright walls 12. A loading member 13 is pivotally secured to an upright wall 12 on the chassis by utilizing a pair of outstanding ears 14 into which the loading member is journalled through a pin 15. A motor 16, which can be mechanically or electrically energized, is secured to the loading member 13. The motor 16 drives a gear train, shown generally by the numeral 17. The gear train serves to move a tape guiding mechanism 18 in both longitudinal and rotational attitudes. The tape guiding mechanism includes a plurality of fingers 19 in which each finger has a depending member 20 extending therefrom. The tape guiding mechanism can be secured to the loading member 13 by a pin 21 or in any other known manner permitting rotational movement of the fingers 19. The phantom lines show the loading member 13 and the fingers 19 in a lowered position, i.e. after the loading member was pivoted about the axis 15.

A cassette holder 22 is journalled in upstanding ears 23 on opposite sides of the holder. A spring 24 has one end secured to the upstanding ears 23 and the other end bears against the holder 22 so as to bias the holder in a clockwise direction around the axis 25. The ears 23 are secured to the chassis 10. The holder 22 is simply a housing having an open front end portion 26 and is otherwise closed. The holder 22 can have a handle 27 thereon which functions as a convenient member for a user to grasp when handling the holder 22.

The holder 22 has a protuberance 28 thereon which can be located on opposite sides of the holder 22 or one can be used. A lever 29 is pivotally secured to the chassis 10 and is biased in a counterclockwise direction around the pin 30 by a spring 31 having one end secured to the lever 29 below the pin 30 and the other end is fixed to the chassis 10. It can readily be seen that by pushing downward on the handle 27, the protuberance 28 will bias the lever 29 clockwise and when the lever returns under the influence of the spring 31, it will latch onto the protuberance and maintain the holder in the lowered dotted line position. To release the holder 22, the user need only pull upwardly on the handle 32 which is connected to the lever 29. This motion urges the lever clockwise, and the protuberance 28 becomes unlatched. The spring 24 thereby returns the cassette holder 22 to its full line position shown. A cassette 33 is located within the cassette holder 22 and is so arranged that the tape on the reels in the cassette is accessible from the rear wall 22*a* of the holder 22 which is partially open to receive the depending members 20 on the fingers 19 of the tape guiding mechanism.

An electrical switch 34 having a depressible contact button 35 which protrudes through an opening 36 in the chassis 10 serves to complete the electrical circuit which energizes the tape record/playback mechanism. The contact button 35 completes the circuit when the cassette holder 22 is in the lowered dotted line position and breaks the circuit when the holder is in the raised full line position.

A pair of substantially "L"-shaped levers 37 have one end journalled to the holder 22 by a pin 38. A lateral extension 39 on the lever 37 has elongated slots 40 therein through which extends pins 41 which extend laterally outwardly from the loading member 13. It can be readily seen, that when the holder 22 is lowered, the lever 37 pivots the loading member 13 into the dotted line position shown and because of the lost motion connection between the extension 39 and the loading member 13, the lever 37 can move longitudinally along the extent of the slot 40.

A drum 42 is mounted for rotation on the chassis 10 in any known manner. For example, a pulley 43 can be driven by a motor and belt drive (not shown). One or more magnetic pick-up heads 45 are secured to the drum and the heads receive and apply signals to the magnetic tape 44 which is wrapped around the drum 42. The tape guiding mechanism 18 withdraws the tape from the cassette and forms it into a loop. The loop is then formed around the drum and dropped whereby the heads 45 can scan the tape 44. Since the means for placing the tape around the drum forms no part of the invention, further detail concerning this is deemed unnecessary.

In actual operation, the user places a cassette 33 in the cassette holder 22 and depresses the handle 27 which moves the holder 22 down against the bias of the spring 24. The cassette holder 22 is held in a horizontal position by the lever 29 extending over the protuberance 28. The bottom wall of the holder depresses the switch contact 35 and thereby energizes the circuit to the motor 16 and to the motor driving the drum 42.

The lever 37 connected to the loading plate 13 forces the latter downward and the depending members 20 on the tape guiding mechanism 18 are inserted into an opening in the cassette holder 22 and the cassette 33 whereby the members are behind the tape when the circuit is energized. The gear members 17 are driven by the motor 16 and the tape guiding mechanism 18 thereby forms the tape 44 into a loop and deposits it around the drum 45 where the tape is in a position to receive or play back signals.

What is claimed is:

1. An apparatus for recording and/or reproducing signals on a magnetic tape wound on reels contained in a cassette which has an opening for exposing the tape between the reels; comprising a chassis, a cassette holder movably mounted on said chassis, a tape guide drum spaced from said holder on said chassis and having at least one rotary magnetic head associated therewith for movement in a circular path corresponding to the surface of said drum, tape guiding means movably mounted on said chassis for pulling out the tape from a cassette received by said holder and for wrapping the pulled-out tape about at least a portion of the circumference of said guide drum, means for biasing said holder to a first position at which said holder is adapted to receive a cassette and at which said tape guiding means is spaced from the cassette received by said holder, means for shifting said holder to a second position in a plane displaced from said first position and at which said holder positions a cassette received therein with respect to said chassis and said tape guiding means projects into said opening of the cassette for engagement with the exposed tape between the reels, and releasable locking means for retaining said holder at said second position.

2. An apparatus according to claim 1, further comprising means connecting said tape guiding means with said cassette holder for effecting movement of said tape guiding means into said opening of the cassette received by said holder in response to said shifting of said holder from said first position to said second position.

3. An apparatus according to claim 1, in which said tape guiding means includes support means which is movably mounted on said chassis for movement between a raised position and a lowered position, and at least one tape engaging finger depending from said support means; and further comprising means connecting said support means with said cassette holder for disposing said support means in said raised position when said holder is in said first position thereof and thereby spacing said finger above a cassette received in said holder, and for moving said support means to said lowered position in response to said shifting of said holder from said first position to said second position whereby said finger enters said opening of the cassette from above for engagement with the tape there exposed.

4. An apparatus according to claim 3, in which said means connecting said support means with said cassette holder is a mechanical linkage extending therebetween.

5. An apparatus according to claim 3, in which said holder is adapted to slidably receive a cassette through the front of said holder, and said holder is pivoted on said chassis to swing about an axis adjacent the back of said holder from said first position, where said front of the holder is elevated relative to said back, and said second position, when said plane of the holder is substantially horizontal.

6. An apparatus according to claim 5, in which said support means is pivoted on said chassis to swing about an axis between said raised and lowered positions and extend forwardly from said axis of pivoting of the support means over said back of the cassette holder, and in which said means connecting said support means with said cassette holder includes a link member connected, at its ends, to front portions of said holder and said support means, respectively.

* * * * *